(12) United States Patent
Jacobs et al.

(10) Patent No.: US 8,176,014 B2
(45) Date of Patent: *May 8, 2012

(54) SYSTEM AND METHOD FOR PROVIDING A CACHE THAT STORES ENTITY BEANS AND EMPLOYS DATA INVALIDATION

(75) Inventors: Dean Bernard Jacobs, Berkeley, CA (US); Robert Woollen, San Francisco, CA (US); Seth White, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 11/697,675

(22) Filed: Apr. 6, 2007

(65) Prior Publication Data

US 2007/0192320 A1 Aug. 16, 2007

Related U.S. Application Data

(63) Continuation of application No. 11/105,263, filed on Apr. 13, 2005, now Pat. No. 7,293,009, which is a continuation of application No. 10/212,382, filed on Aug. 5, 2002, now Pat. No. 6,918,013.

(60) Provisional application No. 60/335,633, filed on Oct. 25, 2001, provisional application No. 60/316,187, filed on Aug. 30, 2001.

(51) Int. Cl.
*G06F 7/00* (2006.01)

(52) U.S. Cl. ........ 707/657; 707/622; 707/636; 709/203; 709/218; 711/119; 711/145; 711/163

(58) Field of Classification Search .................. 707/622, 707/636, 657; 709/203, 218; 711/119, 145, 711/163
See application file for complete search history.

(56) References Cited

U.S. PATENT DOCUMENTS

| | | |
|---|---|---|
| 4,714,996 A | 12/1987 | Gladney et al. |
| 5,163,148 A | 11/1992 | Walls |
| 5,201,010 A | 4/1993 | Deaton et al. |
| 5,561,797 A | 10/1996 | Gilles et al. |
| 5,613,060 A | 3/1997 | Britton et al. |
| 5,634,052 A | 5/1997 | Morris |
| 5,677,945 A | 10/1997 | Mullins et al. |
| 5,765,171 A | 6/1998 | Gehani et al. |

(Continued)

OTHER PUBLICATIONS

"Enterprise JavaBean Deployment Descriptor," Oracle8i Enterprise JavaBeans Developer's Guide and Reference, Release 3 (8.1.7).*

(Continued)

*Primary Examiner* — Cheyne Ly
(74) *Attorney, Agent, or Firm* — Fliesler Meyer LLP

(57) ABSTRACT

Servers in a network cluster can each store a copy of a data item in local cache, providing read access to these copies through read-only entity beans. The original data item in the database can be updated through a read/write entity bean one of the cluster servers. That cluster server has access to an invalidation target, which contains identification information relating to copies of the data item stored on servers in the cluster. Once the read/write bean updates the data item in the database, an invalidate request can be sent or multicast to all cluster members, or to any read-only bean or server contained in the invalidation target. Each server or read-only bean receiving the request knows to drop any copy of the data item in local cache, and can request a current copy of the data item from the database.

15 Claims, 6 Drawing Sheets

U.S. PATENT DOCUMENTS

| | | | |
|---|---|---|---|
| 5,805,798 | A | 9/1998 | Kearns et al. |
| 5,813,017 | A | 9/1998 | Morris |
| 5,832,514 | A | 11/1998 | Norin et al. |
| 5,909,689 | A | 6/1999 | Van Ryzin |
| 5,926,816 | A | 7/1999 | Bauer et al. |
| 6,018,805 | A | 1/2000 | Ma et al. |
| 6,065,046 | A | 5/2000 | Feinberg |
| 6,122,629 | A | 9/2000 | Walker et al. |
| 6,134,673 | A | 10/2000 | Chrabaszcz |
| 6,173,293 | B1 | 1/2001 | Thekkath et al. |
| 6,256,634 | B1 | 7/2001 | Moshaiov et al. |
| 6,304,879 | B1 | 10/2001 | Sobeski et al. |
| 6,345,288 | B1 | 2/2002 | Reed et al. |
| 6,366,930 | B1 | 4/2002 | Parker et al. |
| 6,374,264 | B1 | 4/2002 | Bohannon et al. |
| 6,389,462 | B1 | 5/2002 | Cohen et al. |
| 6,401,239 | B1 | 6/2002 | Miron |
| 6,405,219 | B2 | 6/2002 | Saether et al. |
| 6,425,005 | B1 | 7/2002 | Dugan et al. |
| 6,430,564 | B1 | 8/2002 | Judge et al. |
| 6,438,705 | B1 | 8/2002 | Chao et al. |
| 6,453,321 | B1 | 9/2002 | Hill et al. |
| 6,505,200 | B1 * | 1/2003 | Ims et al. ............... 707/638 |
| 6,505,241 | B2 | 1/2003 | Pitts |
| 6,523,130 | B1 | 2/2003 | Hickman et al. |
| 6,526,521 | B1 | 2/2003 | Lim |
| 6,567,809 | B2 * | 5/2003 | Santosuosso .................. 1/1 |
| 6,578,160 | B1 | 6/2003 | MacHardy et al. |
| 6,609,213 | B1 | 8/2003 | Nguyen et al. |
| 6,651,140 | B1 | 11/2003 | Kumar |
| 6,654,766 | B1 | 11/2003 | Degenaro et al. |
| 6,675,261 | B2 | 1/2004 | Shandony |
| 6,711,579 | B2 | 3/2004 | Balakrishnan |
| 6,721,777 | B1 | 4/2004 | Sharma |
| 6,757,708 | B1 * | 6/2004 | Craig et al. ............... 709/203 |
| 6,775,703 | B1 | 8/2004 | Burns et al. |
| 6,804,818 | B1 * | 10/2004 | Codella et al. ............ 719/315 |
| 6,826,601 | B2 | 11/2004 | Jacobs et al. |
| 6,832,238 | B1 | 12/2004 | Sharma et al. |
| 6,836,889 | B1 | 12/2004 | Chan et al. |
| 6,918,013 | B2 | 7/2005 | Jacobs et al. |
| 6,944,785 | B2 | 9/2005 | Gadir et al. |
| 6,963,857 | B1 | 11/2005 | Johnson |
| 7,000,019 | B2 | 2/2006 | Low et al. |
| 7,028,030 | B2 | 4/2006 | Jacobs et al. |
| 7,065,616 | B2 | 6/2006 | Gajjar et al. |
| 7,085,834 | B2 | 8/2006 | Delany et al. |
| 7,089,317 | B2 | 8/2006 | Jeyaraman et al. |
| 7,089,584 | B1 | 8/2006 | Sharma |
| 7,100,195 | B1 | 8/2006 | Underwood |
| 7,130,964 | B2 | 10/2006 | Ims et al. |
| 7,171,692 | B1 | 1/2007 | DeMello et al. |
| 7,185,364 | B2 | 2/2007 | Knouse et al. |
| 7,188,145 | B2 | 3/2007 | Lowery et al. |
| 7,240,101 | B2 | 7/2007 | Rich et al. |
| 2002/0004850 | A1 | 1/2002 | Sudarshan et al. |
| 2002/0073188 | A1 | 6/2002 | Rawson |
| 2002/0147961 | A1 | 10/2002 | Charters et al. |
| 2002/0188591 | A1 * | 12/2002 | Santosuosso ............... 707/1 |
| 2003/0014480 | A1 | 1/2003 | Pullara et al. |
| 2003/0018732 | A1 | 1/2003 | Jacobs et al. |
| 2003/0041135 | A1 | 2/2003 | Keyes et al. |
| 2003/0115366 | A1 | 6/2003 | Robinson |
| 2006/0143239 | A1 | 6/2006 | Battat et al. |
| 2006/0168118 | A1 | 7/2006 | Godlin et al. |

OTHER PUBLICATIONS

Kooijmans, Alex Louwe, et al., Enterprise JavBeans for z/OS and OS/390 WebSphere Application Server V4.0; IBM.com/redbooks, pp. 31-78 and 185-240 (2001).

Bainbridge, A., et al., "CICS and Enterprise JavaBeans," IBM System Journal, vol. 40, No. 1, pp. 1-19 (2001).

Newport, Billy, "JMX," found at http://www.theserverside.com/tt/articles/article.tss?1=JMX, 6 pages (2001).

BEA Systems, Inc., "WebLogic Server 6.1,"Sep. 19, 2001, 36 pages.

Flowers, Brady, "The J2EE Connector Architecture," Sys-con Media, http://www.sys-con.com/read/36268.htm, May 1, 2001, 4 pages.

Gamma, Erich, et al. "Design Patterns Elements of Reusable Object-Oriented Software," Addison-Wesley Publishing Company, pp. 293-303 (1998).

Marinescu, Floyd, "BEA WebLogic Server 6.1 has been released," The ServerSide.com, Jul. 31, 2001, 1 page.

Rana, Ajaz, et al., "Java Junction," Intelligent Enterprise, http://www.intelligententerprise.com//channeis/integration/feature/010416/feat1.jhtml, Apr. 16, 2001, 9 pages.

Rodoni, Jennifer, "The J2EE Connector Architecture's Resource Adapter," Sun Systems, 12 pages (Dec. 2001).

Sarathy, Vijay, et al., "Integrating Java Applications with the Enterprise," EAI Journal, pp. 50-54 (May 2001).

Stanhope, Jane, "J2EE Connector Architecture Promises to Simplify Connection to Back-End Systems," Giga Information Group, Nov. 16, 2000, 4 pages.

Stearns, Beth, "Using the J2EE Connector Architecture Common Client Interface," Sun, 10 pages (Apr. 2001).

Sun Microsystems, "Enterprise JavBeans Specification™," version 2.0, Aug. 14, 2001.

Visveswaran, Siva, "Dive into Connection Pooling with J2EE," reprinted from JavaWorld, Oct. 2000, 7 pages.

BEA Systems, Inc., "Connection Management," pp. 1-3 (2001).

* cited by examiner

US 8,176,014 B2

SYSTEM AND METHOD FOR PROVIDING A CACHE THAT STORES ENTITY BEANS AND EMPLOYS DATA INVALIDATION

CLAIM OF PRIORITY

This application is a Continuation of U.S. patent application Ser. No. 11/105,263, filed on Apr. 13, 2005, entitled "SYSTEM AND METHOD FOR FLUSHING BEAN CACHE," currently pending, which is a Continuation of U.S. application Ser. No. 10/212,382 filed on Aug. 5, 2002, entitled "SYSTEM AND METHOD FOR FLUSHING BEAN CACHE," now U.S. Pat. No. 6,918,013, issued Jul. 12, 2005, which claims priority to U.S. Provisional Patent Application No. 60/335,633, filed Oct. 25, 2001, entitled "SYSTEM AND METHOD FOR FLUSHING BEAN CACHE," and to U.S. Provisional Patent Application No. 60/316,187, filed Aug. 30, 2001, entitled "CLUSTER CACHING WITH CONCURRENCY CHECKING," all of which are incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. Provisional Application No. 60/305,986 entitled "DATA REPLICATION PROTOCOL," by Dean Bernard Jacobs, Reto Kramer, and Ananthan Bala Srinvasan, filed Jul. 16, 2001.

U.S. Provisional Application No. 60/316,187 entitled "CLUSTER CACHING WITH CONCURRENCY CHECKING," by Dean Bernard Jacobs and Rob Woollen, filed Aug. 30, 2001.

TECHNICAL FIELD

The invention relates generally to a system and method for storing data on a network.

BACKGROUND

When a data item is stored in a single database or data store that is accessible over a network, it is often the case that multiple servers or clients will require access to that data item. Traditionally, this requires a hit to the database each time the data item is accessed. Each hit to a database is relatively resource intensive and relatively inefficient.

One way of overcoming some of the efficiency and scalability problems is to store a local copy of the data item in cache memory. A server or client can then use that local copy if future access to the data item is needed. This process may be appropriate and efficient for data items that never change, but problems can arise when a data item is updated in the database.

If a data item in the database is updated, a copy of that data item stored in a local cache on the network will be different than the item in the database, as the cache will not automatically receive the update. The problem intensifies when there are local copies on multiple servers and/or clients on the network. Since each of these local copies is created at a different time, there can be multiple versions of the data item on the network. If a user tries to update or view the data item, the copy accessed by the user may not be current and correct.

Such a problem with data latency can cause serious problems for applications that require near real-time accuracy, such as web sites that offer "real time" stock prices. Such an application might utilize a database table having at least two columns, one column containing stock symbols, which can be used as primary keys for the table, and one column containing the current price of each stock. In such an application, most of the activity involves users accessing the site and reading the current stock values. There is typically also activity involving back-end applications or systems that come in periodically, such as once every minute, with updated stock prices. These back-end systems need read/write access to the database in order to update the data.

Most access to the system will be read only. For these read-only users, the system can cache data to provide faster access. The system can update the cached information periodically, such as every fifteen minutes. In such a "read-mostly" situation, however, it may be preferable to give a user the most recent data. A fifteen minute delay in providing accurate information may be undesirable for many applications. It is typically desirable to give users information that is as accurate as possible.

One way to ensure that users get accurate information, or at least information that is current with data stored in the database, is to pull the information from the database for each request instead of reading a cached copy. This can be very expensive for many applications, as a hit to a database is much more time and resource intensive than reading a value from memory.

For people updating the data in the database, it may be desirable to wrap as many updates as possible into a batch transaction in order to improve performance. Wrapping updates into a single transaction also ensures that either all the updates occur or none of the updates occur. Problems arise, however, in how to update cached copies for each item updated in a transaction.

BRIEF SUMMARY

A system and method are included for updating a copy of a data item stored in local cache on at least one server in a network cluster. Identification information is provided to a read/write bean stored on a server in the cluster. The identification information relates to any server in the cluster that contains a read-only bean and a copy of the data item in local cache. A read-only bean provides read access to the local copy of the data item. The original data item is stored in a network database, and is updated using the read/write bean. When the data item is updated by the read/write bean, an invalidate request can be sent or multicast from the server containing the read/write bean to the entire cluster, or can be sent to any server or read-only bean identified by the identification information having a local copy of the data item. Any local copy of the data item can then be dropped in response to the request. A current copy of the data item can be read from the database and stored in local cache.

DETAILED DESCRIPTION

Figure 1:
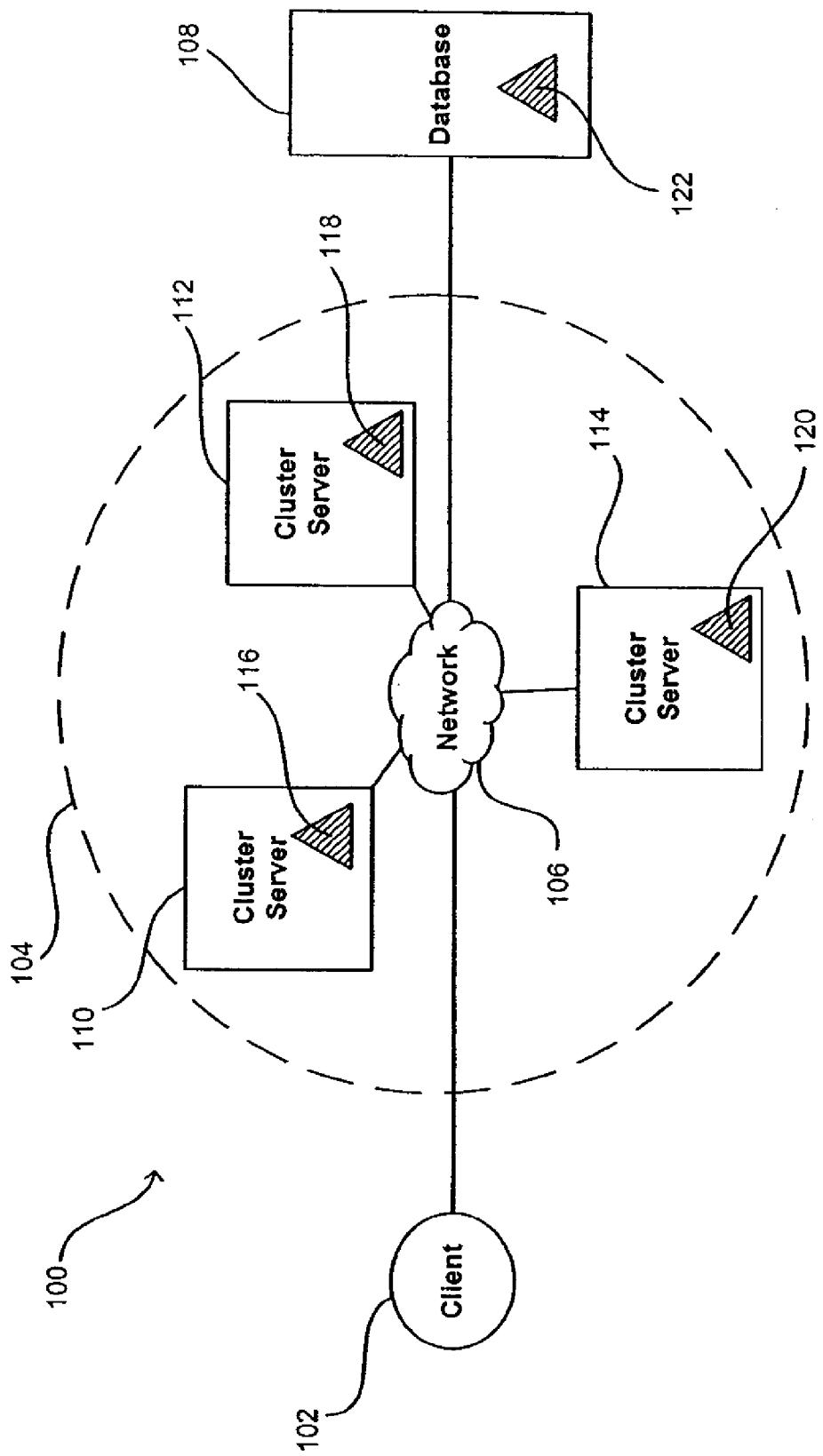
FIG. 1 is a diagram of a system in accordance with one embodiment in accordance with the present invention.

In order to maintain consistency among items distributed on a network, a system in accordance with the present invention can take advantage of beans, or JavaBeans. A bean is basically a framework for components that can be added to a server to extend functionality. One embodiment utilizes two types of beans, "read-only" entity beans and "read/write" entity beans. An entity bean is a bean that is persistent, allows shared access, has primary keys, and can participate in relationships with other entity beans. Each entity bean can have an underlying table in a relational database, with each instance of the bean corresponding to a row in that table.

A read-only bean is a bean that can be cached on a server, such as an enterprise JavaBean that resides in a network cluster. The read-only bean can provide read access to any server in the cluster, as well as to any client inside or outside of the cluster. The read/write bean is transactional, residing on a server in the cluster and providing cluster servers with read/write access to a network database. The read-only bean deals with data in local cache on a cluster server. The read/write bean deals with information in a database.

One way to address the concurrency of information in the cache and in the database is to associate a timeout value with each read-only entity bean. For example, a read-only bean can be deployed with a default cycle of ten minutes. After each period of ten minutes passes, the read-only bean goes back to the database and reads the current value. This approach can work well for certain applications, such as those applications with values that change at a regular interval.

There may be applications, however, which have data that changes very infrequently. When this data changes, users may want to know about the change as soon as possible. Since the data does not change very often, it is tempting to set a long read cycle time in order to conserve resources. This can have the undesirable effect, however, of creating latency issues with the data, as the resultant delay in updating the data can be almost as long as the cycle time, depending on the point in the cycle at which the update occurs. For such applications, it is desirable that the data accessible by a read-only user is updated as soon as possible after the data is the database is updated.

One system in accordance with the present invention provides an interface, exposed by a read-only bean. The interface allows a user or application to tell the system to drop a cache, or "invalidate" a cache, when the user updates a data item or is aware of an update. This interface shall be referred to as a "CachingHome," as an entity bean typically has a "home" or factory that creates it. CachingHome can have three methods on it, and be coded as follows:

```
package weblogic.ejb;
public interface CachingHome {
    public void invalidate(Object pk) throws RemoteException;
    public void invalidate(Collection pks) throws RemoteException;
    public void invalidateAll( ) throws RemoteException;
}
```

The method invalidate (Object pk) lets a user invalidate data associated with a particular primary key in a database or data table. The method invalidate (Collection pks) lets a user invalidate data for a collection or group of keys. The method invalidateAll ( ) allows a user to invalidate data for all keys in the database table. These invalidate methods allow a user to ensure that values are stored in local cache until a programmer, application, user, or system says otherwise.

Figure 5:
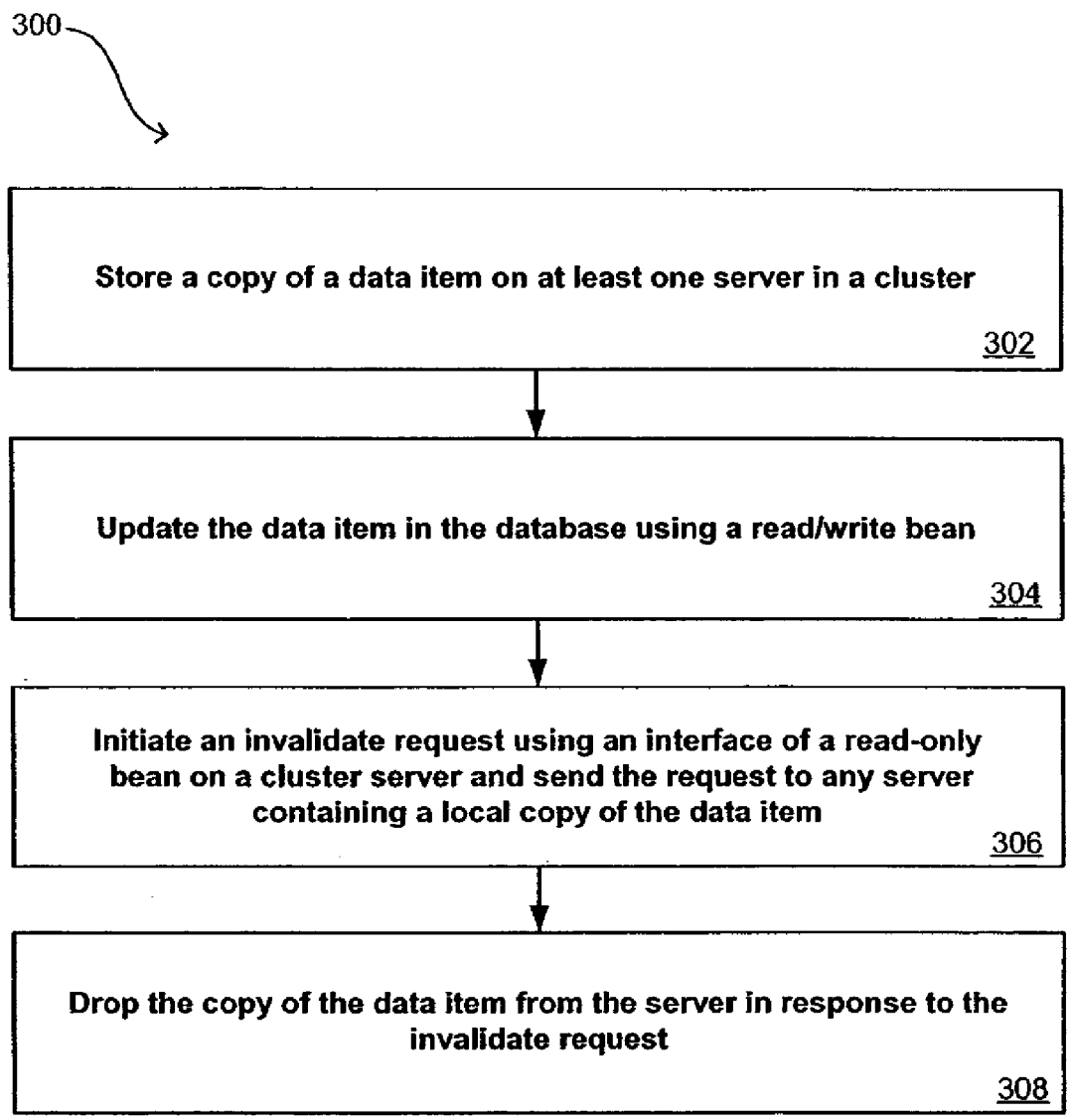
FIG. 5 is a flowchart for a method in accordance with another embodiment of the present invention.

One such method 300 is shown in the flowchart of FIG. 5. A copy of a data item is stored on at least one server in a network cluster 302. The data item can be updated in the database using a read/write bean on one of the cluster servers 304. An invalidate request can then be initiated using an interface of a read-only bean located on one of the servers, the request being sent to any server containing a local copy of the data item 306. Any copy of the data item can then be dropped from a server receiving the request 308.

In a system 100 with a network cluster 104, such as is shown in FIG. 1, it is possible that a copy of a value 122 stored in a database 108 is cached on each server 110, 112, 114 in the cluster 104. If a client 102 contacts server 110 through the network 106 and requests that server 110 invalidate a given key, such as by making the request "invalidate (Key)," it is easy for server 110 to drop its cached copy 116 of the value 122 or values associated with that key. A problem exists, however, in how to get servers 112 and 114 to drop their cached copies 118, 120 as well.

Figure 2:
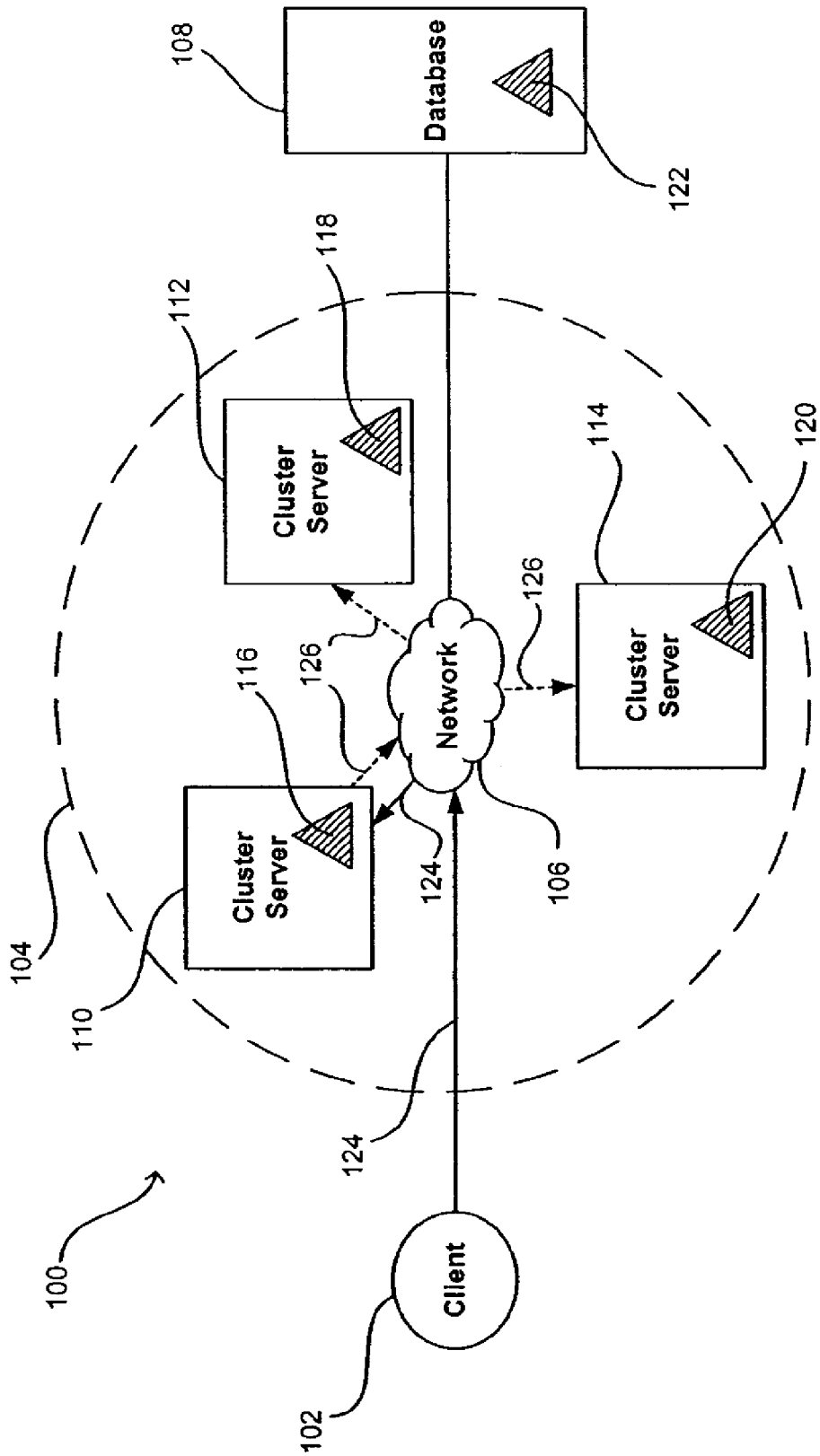
FIG. 2 is a diagram of a system in accordance with the embodiment of FIG. 1.

One embodiment allows server 110 to drop a copy 116 in local cache when it receives an invalidate request 124 from the client 102, as shown in FIG. 2. After dropping the copy 116 from local memory, server 110 can send a message 126 on multicast to the other servers 118, 120 or read-only beans in the cluster 104 to drop the copy of the value in local cache. Multicast is a technique for sending a packet of information or a message from one server, or source, to other servers without having any unnecessary packet duplication, as one packet is sent from the source and replicated across the network as needed. This approach allows each server to drop the cached value when the value in the database is updated.

Figure 6:
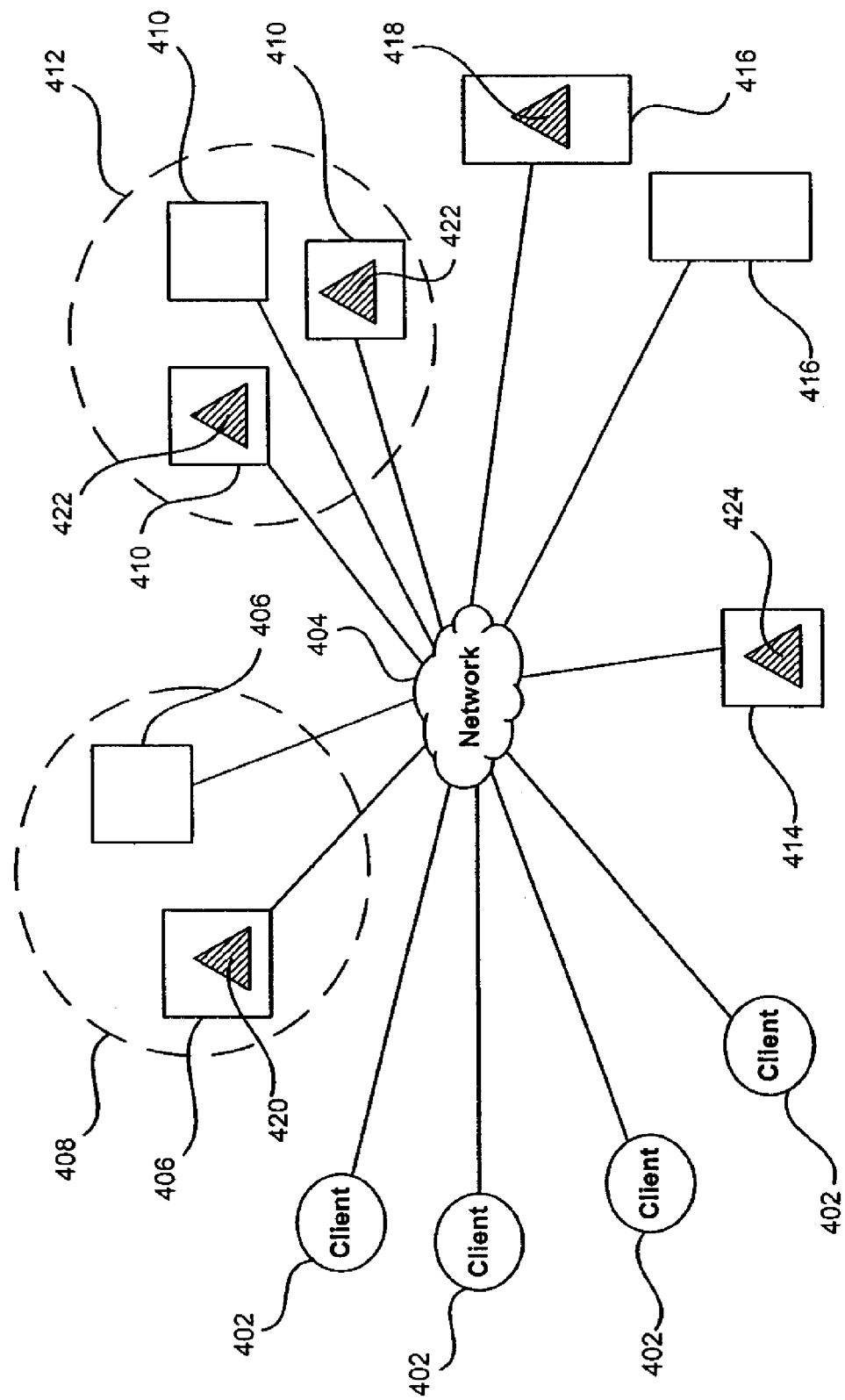
FIG. 6 is a diagram of a system in accordance with another embodiment in accordance with the present invention.

FIG. 6 shows another system which includes multiple clients 402 and multiple databases 416 in communication with the network 404. A data item 418 is stored in one of the databases 416. A copy 420 of the data item is stored in a cluster server 406 of cluster 408. There are two copies 422 stored in cluster servers 422 of cluster 412, as well as a copy 424 on server 414, which is not contained in any server cluster. This system would work similar to the system of FIGS. 1 and 2, in that one of the servers 406, 410, 414 containing a copy of the data item 418 can drop a copy in local cache when it receives an invalidate request from a client, and can send a message on multicast to the other servers on the network to drop any copy of the value in local cache.

Another problem exists due to the fact that a multicast message is only sent once by the source and does not wait for confirmation of receipt by the other servers. A server in the cluster might not get an invalidate request, such as if it is temporarily offline. A system in accordance with the present invention can provide a more reliable multicast by tagging each such message or request with a version number or sequential number. In this way, a server receiving a request will know the version of the request, as well as the version of the last request it received, such that the server will know if it missed a message. Once a server determines that it has missed a message, it can request that the message be sent again so that it can update accordingly.

One problem with this approach, however, is that a server-will not know it has missed an update until another update is sent. In certain applications such as an on-line store posting weekly specials for weeks 1, 2, and 3, it may be unacceptable to wait until the next update to get correct information. The store would not realize that it had missed the specials for week 2 until the update for week 3. The week 1 specials would have remained up during week 2, displaying the wrong information to any user accessing the system during that time. When the system realizes that it missed the week 2 update, it will already be week 3. The server will end up simply discarding the week 2 information without the information ever having been displayed to a user.

A system in accordance with the present invention can get around this problem by periodically "heartbeating" information to the servers in the cluster. A server heartbeats a packet of information or a message by sending the message periodically over the network or cluster. A heartbeat message can contain information such as the latest version number, previous version numbers, or the actual update information itself if the update information is small enough to be practical. If a server receives a heartbeat message containing the latest version number, and the server is not on that version of the data or did not receive the latest invalidate request, the server can request or pull the invalidate message from the server.

The initiating server that initially sent the invalidate request, which may also be the server sending the multicast and/or heartbeats, can store recent requests for a certain amount of time or can store a certain number of recent requests. If a cluster server requests an invalidate message that the initiating server is still storing, the initiating server can simply send the message to the cluster server, by a method such as a multicast or a point-to-point connection. If the initiating server no longer has the message, the initiating server can tell the cluster server to simply drop its entire cache, since it is not possible to tell the cluster server which keys have changed. The cluster server can read new and/or current information from the database. This can temporarily lessen performance, but the newly-cached information will at least be current with the information in the database.

In operation, a client or application can update a data item through a read/write entity bean. The update, or a transaction containing multiple updates, will commit to the database. An invalidate message can be sent to the servers in the cluster, with the message being triggered for example by the client or server updating the data item. The cluster servers can each drop any copy in local cache and can read in the new value from the database, either right away, later, or when necessary to serve a request. Normally it is not possible to read uncommitted data, so it may be preferable to use a two-step process where the data is committed first and then a message is multicast to the cluster.

One problem with the above approach is that it forces a client to initiate an invalidate request, which can involve a little more complexity for the client. There is also the possibility that the client could use the invalidate method incorrectly or make a mistake. It may therefore be preferable that the system can do it automatically.

A system in accordance with the present invention can address this problem by using an "invalidation target." An invalidation target is based on the idea that the read-only and read/write beans point to the same data in the database, with the people reading the data using the read-only bean and the people updating the data using the read/write bean. The idea is to invalidate the read-only bean when the read/write bean is updated or modified.

When deploying an entity bean or enterprise JavaBean, there is typically a deployment descriptor used to store meta data about the actual entity bean. A deployment descriptor can be, for example, an XML document used to provide information about the services provided by the bean that should be made available to clients. The information can provide a wide variety of information to the clients, such as request routing information, as well as method and class details for a supporting Java class. A tag can be added to the deployment descriptor, referred to previously as an "invalidation target." The invalidation target for a read/write bean can contain the identity of any associated read-only bean. The invalidation target can be used to automatically invalidate any associated read-only bean(s) when the read-only bean is updated.

In one embodiment, the invalidation target can be updated when a server requests information from a read/write bean or generates a read-only bean does the request. When the read/write bean forwards information from a database or data store to the requesting server, the read/write bean can also update the invalidation target. An XML file stored on the server containing the read/write bean can be updated to include the identity of the server requesting the information or creating the bean.

Figure 3:
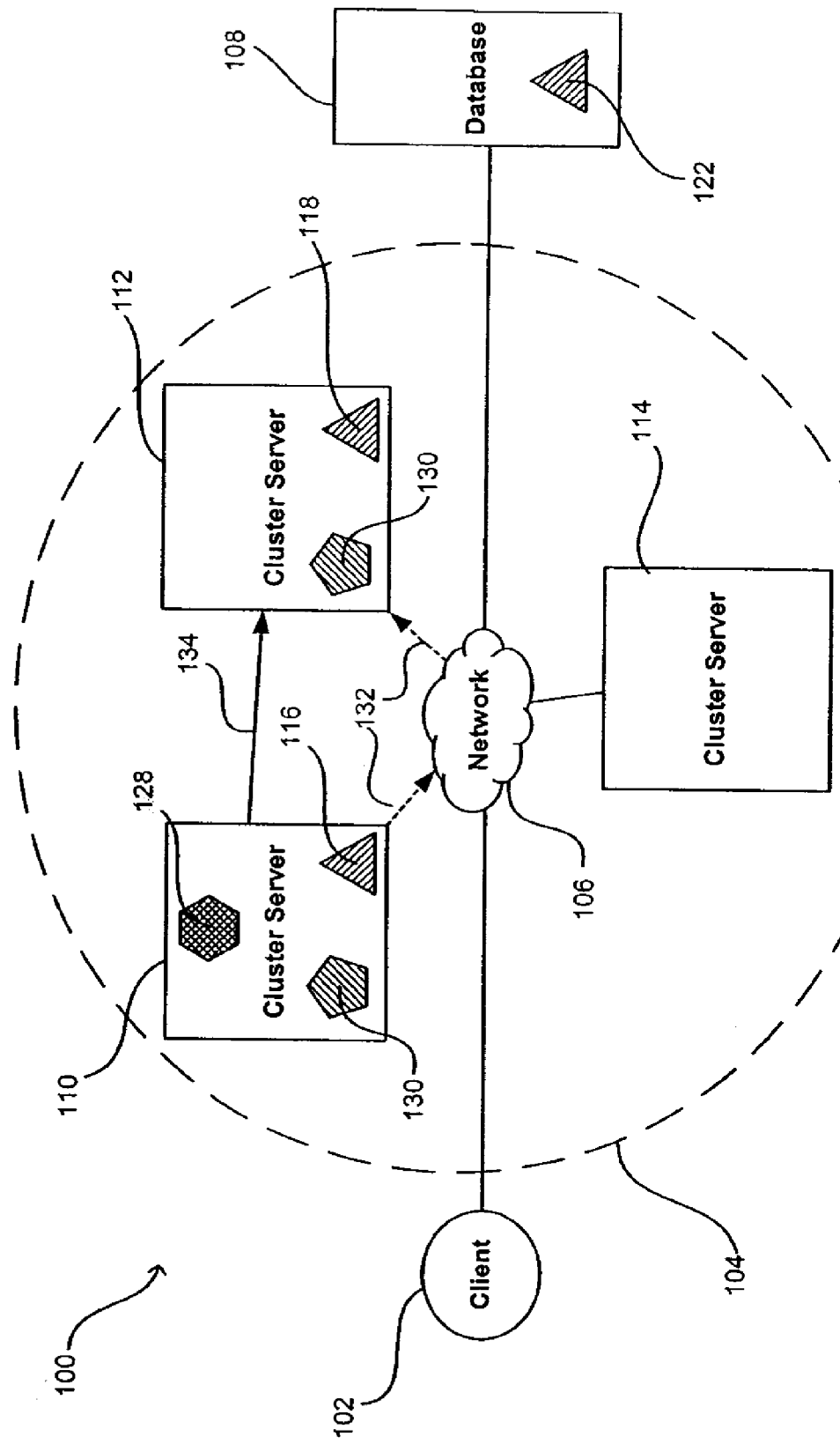
FIG. 3 is a diagram of an alternative embodiment of the system of FIG. 1.

FIG. 3 again shows the system 100 of FIG. 1, except in this embodiment the system is shown taking advantage of an invalidation target. Whenever a read/write bean 128 is used to update a data item 122, the system can look to the invalidation target associated with that read/write bean 128 and send an invalidate request to each read-only bean 130 associated with that read/write bean. The invalidate request can be acted on directly by server 110, which contains both the read/write bean 128 and a read-only bean 130. The invalidate request can also be sent by any appropriate protocol to other servers containing a read-only bean 130, which would be in the invalidation target. In one approach, server 110 contacts server 112 directly by a point-to-point connection 134, telling the read-only bean 130 on server 112 to drop the cached copy 118 on server 112. In another approach, server 110 can send a multicast message 132 over the network 106 to any server which contains a read-only bean 130 within the scope of the invalidation target, such as server 112.

A subsequent call to an invalidated read-only bean can cause a method such as ejbLoad to be called, which can read current information from the database into cache. For example, a container-managed persistence (CMP) bean, an entity bean whose state is automatically synchronized with a database, can use an invalidation-target element in an XML file such as ejb-jar.xml to specify a read-only entity bean that should be invalidated when the read/write bean has been modified. The container in this example can automatically invalidate the invalidation-target, such as after the transaction is completed.

Figure 4:
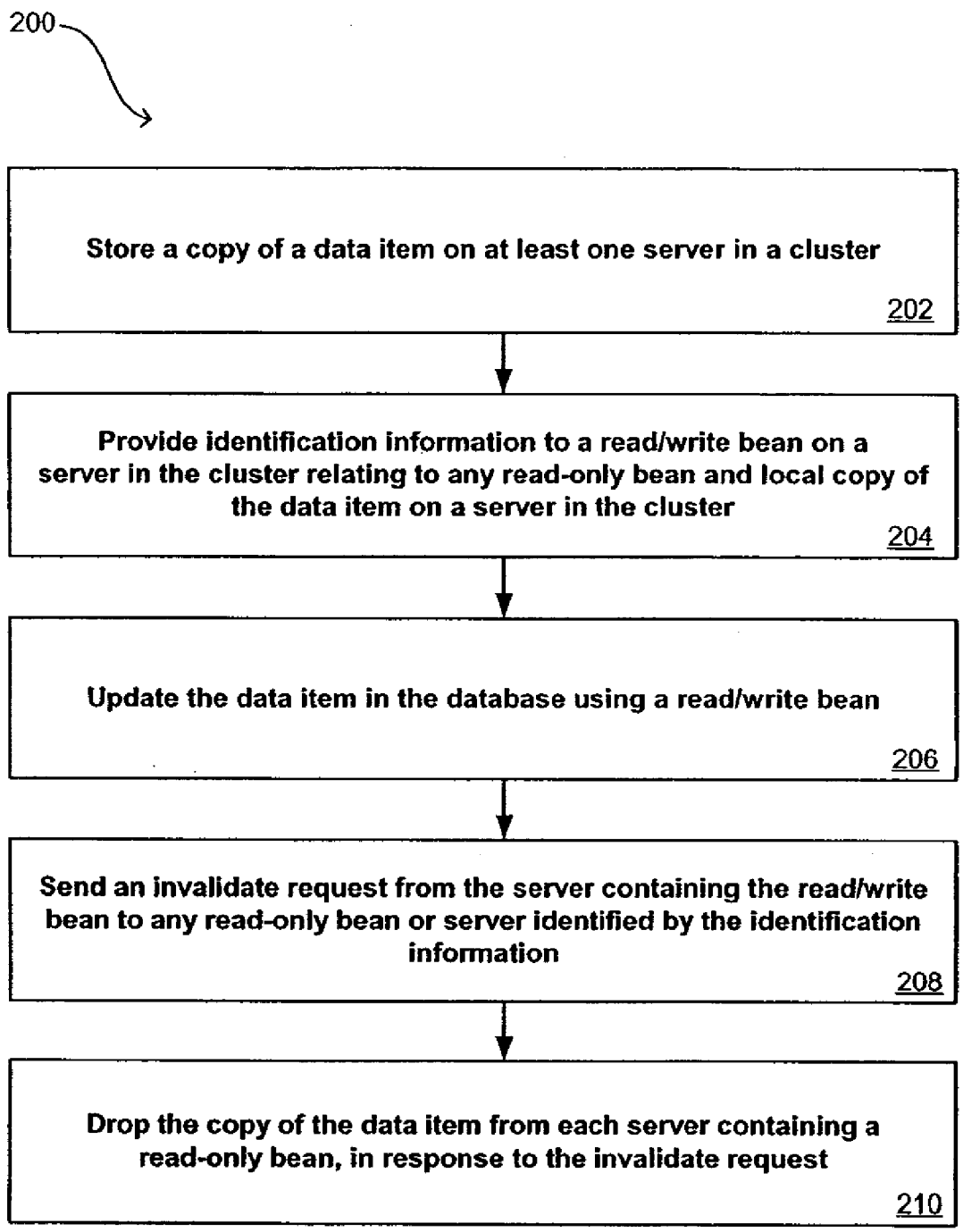
FIG. 4 is a flowchart for a method in accordance with one embodiment of the present invention.

Such a method 200 is shown in the flowchart of FIG. 4. A copy of a data item is stored on at least one server in a network cluster 202. Identification information, or an invalidation target, is provided to a read/write bean on a server in the cluster, the information relating to any server in the cluster containing a read-only bean and a local copy of the data item 204. The data item can be updated in the database using a read/write bean 206. An invalidation request can be sent from the server containing the read/write bean to any server identified by the identification information 208. The copy of the data item can then be dropped by each server receiving the request 210.

In this way, customers or clients do not have to write any additional code to invalidate an item. In accordance with an embodiment of the present invention, only an invalidation target must be specified in order to keep the read/write and read-only beans coherent. The beans can coexist on the same server, with the read-only bean reading items from local cache and the read/write bean reading from, and writing to, the database.

In order to improve performance, a system in accordance with the present invention can instead wait until an entire transaction or series of updates is committed to the database or data table, instead of sending an individual message for each update. A server, such as the server initiating the update, can keep track of which keys were updated during the transaction and multicast a single message that includes information for all updated primary keys. Such batching of messages can improve the overall performance of such a system and can reduce the opportunity for error or inconsistencies.

One example of a system that can be used in accordance with the present invention contains a table of stock symbols, as well as information associated with each symbol, such as price and volume. A Java server page can be used to allow a user to request the current price of a stock. The Java server page can read the information from a read-only entity enterprise Java bean. A Java Message Service (JMS) queue can receive messages with updates to stock prices. An message-driven bean can de-queue these messages and update the associated CMP entity bean. When this modification occurs, the container can invalidate the associated read-only bean.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for caching entity beans in a cluster environment, said system comprising:
    a database connected to the cluster, said database storing at least one data item; and
    a server device connected to the cluster, said server device caching a plurality of entity beans, each entity bean containing a copy of said data item;
    wherein the server device includes one or more read-only entity beans that allow shared access to said data item by clients such that the data item is not modified within the database as a result of the shared access, wherein each of the one or more read only entity beans located on said server device exposes an interface to invalidate the copy of said data item stored locally on the server device;
    wherein the server device further includes a bean providing write access to the same data item in the database that is accessed by the one or more read-only entity beans;
    wherein a deployment descriptor associated with the bean providing write access contains an invalidation target tag that identifies the one or more read-only entity beans associated with the data item, wherein the invalidation target tag in the deployment descriptor is used to invalidate the one or more read-only entity beans; and
    wherein after the data item is modified in the database by using the read/write bean, the one or more read-only entity beans on the server device receive an invalidate request on the interface exposed by said read-only entity beans, wherein the server device then drops the copy of the data item stored locally in response to said invalidate request and multicasts said invalidate request to a plurality of other servers in the cluster containing a local cached copy of said data item, wherein the multicasting of the invalidate request instructs said plurality of other servers to drop the local cached copy of said data item.

2. The system of claim 1 wherein each bean in said cache has an underlying database table in said database such that each instance of said entity beans corresponds to a row in said database table.

3. The system of claim 1 wherein each read-only entity bean in said cache is associated with a timeout value.

4. The system of claim 1 wherein each entity bean can participate in relationships with other entity beans in said cache.

5. The system of claim 1 wherein each server in said cluster can drop any copy of said data item in the cache and can read in a new value from said database when necessary to serve a request.

6. The system of claim 1 wherein each entity bean is a container-managed persistence (CMP) bean and wherein each entity bean calls on the Enterprise JavaBean (EJB) load method in order to read said data item from the database.

7. A method for caching entity beans in a cluster environment, said method comprising:
    storing a copy of a data item in a read-only entity bean on at least one server in the cluster, said read-only entity bean providing read access to the copy of the data item, wherein the read-only entity bean located on said at least one server exposes an interface to invalidate the copy of said data item stored locally on the server;
    providing identification information to a read/write bean enabling write access to the same data item in the database that is accessed by the read-only entity bean, said identification information relating to the read-only entity bean;
    wherein a deployment descriptor associated with the bean enabling write access contains an invalidation target tag that identifies the read-only entity bean associated with the data item, wherein the invalidation target tag in the deployment descriptor is used to invalidate the read-only entity bean; and
    wherein after the data item is modified in the database by using the read/write bean, the read-only entity bean on the server device receive an invalidate request on the interface exposed by said read-only entity beans, wherein the server device then drops the copy of the data item stored locally in response to said invalidate request and multicasts said invalidate request to a plurality of other servers in the cluster containing a local cached copy of said data item, wherein the multicasting of the invalidate request instructs said plurality of other servers to drop the local cached copy of said data item.

8. The method of claim 7 wherein each entity bean in said server has an underlying database table in said database such that each instance of said entity beans corresponds to a row in said database table.

9. The method of claim 7 wherein each read-only entity bean in said server is associated with a timeout value.

10. The method of claim 7 wherein each entity bean can participate in relationships with other entity beans in said server.

11. The method of claim 7 wherein each server in said cluster can drop any copy of said data item and can read in a new value from said database when necessary to serve a request.

12. The method of claim 7 wherein each entity bean is a container-managed persistence (CMP) bean and wherein each entity bean calls on the Enterprise JavaBean (EJB) load method in order to read said data item from the database.

13. A computer readable storage medium having object code stored thereon which when executed by one or more processors causes the one or more processors to:
 store a copy of a data item in a read-only entity bean on at least one server in the cluster, said read-only entity bean providing read access to the copy of the data item, wherein the read-only entity bean located on said at least one server exposes an interface to invalidate the copy of said data item stored locally on the server;
 provide identification information to a read/write bean enabling write access to the same data item in the database that is accessed by the read-only entity bean, said identification information relating to the read-only entity bean;
 wherein a deployment descriptor associated with the bean enabling write access contains an invalidation target tag that identifies the read-only entity bean associated with the data item, wherein the invalidation target tag in the deployment descriptor is used to invalidate the read-only entity bean; and
 wherein after the data item is modified in the database by using the read/write bean, the read-only entity bean on the server device receive an invalidate request on the interface exposed by said read-only entity beans, wherein the server device then drops the copy of the data item stored locally in response to said invalidate request and multicasts said invalidate request to a plurality of other servers in the cluster containing a local cached copy of said data item, wherein the multicasting of the invalidate request instructs said plurality of other servers to drop the local cached copy of said data item.

14. The system of claim 1, wherein the one or more read-only entity beans referenced by the invalidation target tag are updated when data is requested from the bean providing write access to the copy of the data item or when a read-only bean is generated.

15. The method of claim 7, wherein the read-only entity bean referenced by the invalidation target tag is updated when data is requested from the bean providing write access to the copy of the data item or when the read-only bean is generated.

* * * * *

UNITED STATES PATENT AND TRADEMARK OFFICE
CERTIFICATE OF CORRECTION

PATENT NO.        : 8,176,014 B2
APPLICATION NO.   : 11/697675
DATED             : May 8, 2012
INVENTOR(S)       : Jacobs et al.

It is certified that error appears in the above-identified patent and that said Letters Patent is hereby corrected as shown below:

On the Title Page, Item (57), under "Abstract", line 4, delete "one" and insert -- on one --, therefor.

On Title page 2, Item (56), under "Other Publications", line 28, delete "JavBeans" and insert -- JavaBeans --, therefor.

On Title page 2, Item (56), under "Other Publications", line 28, delete "JavBeans" and insert -- JavaBeans --, therefor.

In column 1, line 10, after "CACHE,"" delete "currently pending,".

In column 4, line 64-65, delete "serverwill" and insert -- server will --, therefor.

In column 5, line 7, delete "serverwill" and insert -- server will --, therefor.

Signed and Sealed this
Twelfth Day of February, 2013

Teresa Stanek Rea
*Acting Director of the United States Patent and Trademark Office*